Nov. 4, 1952   J. LABRECQUE   2,616,756

ANTIGLARE DEVICE FOR MOTOR VEHICLES

Filed Aug. 10, 1949

Inventor:
Joseph Labrecque
By
Attorney

Patented Nov. 4, 1952

2,616,756

UNITED STATES PATENT OFFICE 2,616,756

ANTIGLARE DEVICE FOR MOTOR VEHICLES

Joseph Labrecque, Montreal, Quebec, Canada

Application August 10, 1949, Serial No. 109,555
In Canada September 14, 1948

3 Claims. (Cl. 296—97)

The present invention pertains to a novel antiglare device adapted to be mounted between the driver and the windshield of a motor vehicle.

The principal object of the invention is to reduce the glare of illuminated objects and the headlights of approaching vehicles at night and of high-lighted objects and surfaces in sunlight.

Another object is to provide a device that protects the eyes from strong light without reducing visibility. A further object is to provide a protective screen that is adjustable in height and inclination.

A still further object is to provide such a device that is of simple, rugged, and economical construction.

In the accomplishment of these objects, the device includes a mounting fixed to the frame of the windshield. The mounting carries a socket member in which the screen is secured by a set screw and also carries a clip to support the lower edge of the screen. The screen is readily removable to be changed for day and night driving.

The invention is fully disclosed by way of example in the following description and in the accompanying drawings in which.

Figure 3:
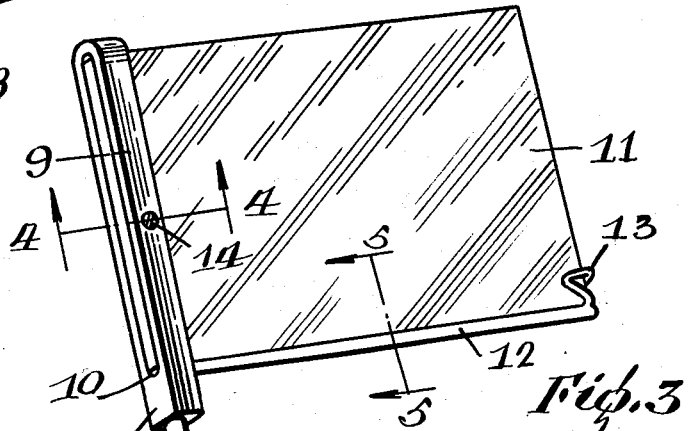
Figure 3 is a perspective view of the device.
Figure 4:
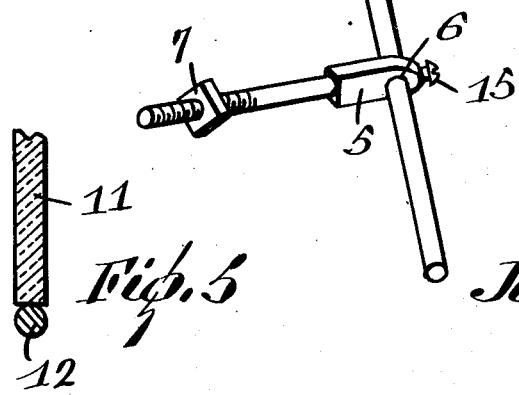
Figure 5:
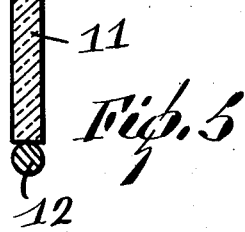

Figures 4 and 5 are sections on the lines 4—4 and 5—5 of Figure 3.

References to these views will now be made by use of like characters which are employed to designate corresponding parts throughout.

Figure 1:
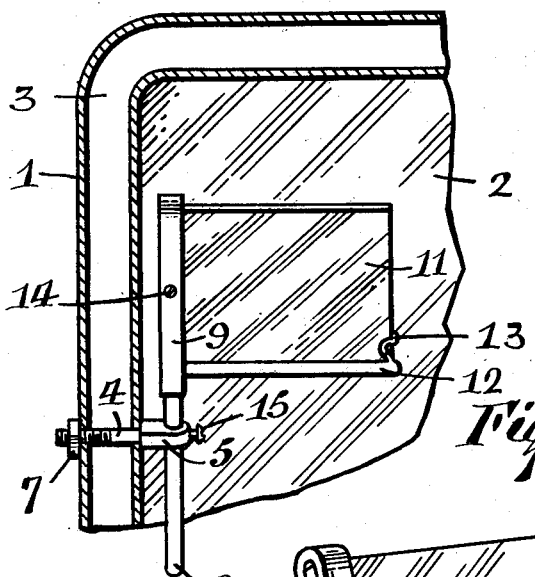
Figure 1 is an elevation of the device applied to a windshield frame shown in section.
Figure 2:
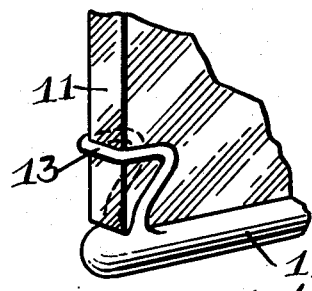
Figure 2 is a perspective view of a corner of the device.

In Figure 1 of the drawing is shown a section of the frame 1 of the windshield glass 2 of a motor vehicle. The frame is ordinarily made of sheet metal rolled into tubular form and is therefore hollow at 3. At the driver's side the frame receives a horizontal screw 4 threaded at one end and formed at the other end with a longitudinally extending flattened head 5. Through the head is formed a transverse hole 6 for a purpose that will presently appear. The head bears against the inner side of the frame 1, and the member 4 is secured by a nut 7 on the threaded end and bearing against the outer side of the frame.

A rod 8 is passed through the hole 6 and forms the mounting of the device of the invention. On the upper end of the rod is fixed a socket member 9 having opposite sides slotted at 10 for the major portion of its length. One end of an anti-glare screen 11 is received in the slots 10.

From the lower end of the member 9 extends a perpendicular bar 12 having its outer end formed as a clip or double hook 13 in the shape of the numeral 7 at each of its two sides. The screen 11 has its lower edge inserted in the clip 12 and its outer lower corner received between the sides of the hook 13. A set screw 14 carried by the member 9 secures the screen in its mounting, and another set screw 15 in the head 5 secures the screw 4 on the rod 8.

In the use of the device, the forward or backward tilt of the rod 8 is set by the screw 4 which is then secured by the nut 7. The lateral tilt of the screen 11 is determined by turning the rod 8 in the head 5 and tightening the set screw 15, after the height of the screen has been adjusted.

As already indicated, the screen 11 is placed before the eyes of the driver and behind the windshield 2. The screen consists of smoked or tinted glass which may, for example, be colored with chlorophyl which is restful to the eyes. Also, the glass is of such nature as to polarize light. During the day the screen obscures glaring due to strong light on bright objects and large plane surfaces such as bodies of water. For night driving the screen 11 is replaced by another suited to cut down the glare of illuminated bodies and the headlights of approaching vehicles.

Although a specific embodiment of the invention has been illustrated and described, it will be understood that various alterations in the details of construction may be made without departing from the scope of the invention as indicated by the appended claims.

What I claim is:

1. An anti-glare device for motor vehicles comprising a mounting member adapted to be secured to a windshield frame, a rod adjustable lengthwise in said member, a slotted socket member extending from the upper end of said rod and alined therewith, an elongated bar extending perpendicularly from the lower end of said socket member, and a glass screen fitted in said socket member and resting tangentially on said elongated bar.

2. An anti-glare device for motor vehicles comprising a mounting member adapted to be secured to a windshield frame, a rod adjustable lengthwise in said member, a slotted socket member extending from the upper end of said rod and alined therewith, an elongated bar extending perpendicularly from the lower end of said socket member, a double hook on the free end of said bar, and a glass screen fitted in said socket member and hook and resting tangentially on said elongated bar.

3. An anti-glare device for motor vehicles comprising a mounting member adapted to be secured to a windshield frame, a rod adjustable lengthwise in said member, a slotted socket member extending from the upper end of said rod and alined therewith, an elongated bar extending perpendicularly from the lower end of said socket member, a double hook on the free end of said bar, and a glass screen fitted in said socket member and hook and resting tangentially on said elongated bar, said rod being rotatable in said member, and a set screw in said mounting member for engaging said rod.

JOSEPH LABRECQUE.

REFERENCES CITED

The following references are of record in the file of this patent:

UNITED STATES PATENTS

| Number | Name | Date |
|---|---|---|
| 1,746,334 | Bollesen | Feb. 11, 1930 |
| 1,807,760 | Snow | June 2, 1931 |
| 1,895,583 | Rabbit | Jan. 31, 1933 |

FOREIGN PATENTS

| Number | Country | Date |
|---|---|---|
| 281,948 | Great Britain | Dec. 15, 1927 |